United States Patent [19]

Ishikawa

[11] 4,107,376
[45] Aug. 15, 1978

[54] GRANULATED FIRE RETARDANT MATERIALS

[76] Inventor: Takashi Ishikawa, 1355, Ohaza Higashine-ko, Higashine-shi, Yamagata-ken, Japan

[21] Appl. No.: 664,067

[22] Filed: May 27, 1976

[30] Foreign Application Priority Data

Jun. 24, 1975 [JP] Japan .................................. 50-79491

[51] Int. Cl.² ........................... B32B 3/26; B32B 5/18
[52] U.S. Cl. ..................................... 428/306; 428/310; 428/403; 428/404; 428/407; 428/913; 428/921
[58] Field of Search ............... 428/304, 306, 307, 403, 428/404, 407, 913, 920, 921, 310, 315

[56] References Cited

U.S. PATENT DOCUMENTS

| | | | |
|---|---|---|---|
| 3,147,177 | 9/1964 | Owens et al. | 428/310 |
| 3,515,624 | 6/1970 | Garnero | 428/305 |
| 3,778,304 | 12/1973 | Thompson | 428/921 |
| 3,904,539 | 9/1975 | Ruff | 428/307 |
| 3,934,066 | 1/1976 | Murch | 428/921 |
| 3,974,318 | 8/1976 | Lilla | 428/921 |
| 4,024,310 | 5/1977 | Wooler et al. | 428/921 |

Primary Examiner—William J. Van Balen
Attorney, Agent, or Firm—Fleit & Jacobson

[57] ABSTRACT

The invention provides a heat-resistant composite comprising a noncombustible porous core material (e.g., a calcined mineral such as perlite, etc.) which has been impregnated or coated with an inorganic filler material (e.g., sodium metaborate, sodium meta silicate, sodium metaphosphate, etc.) capable of foaming spontaneously when heated at an elevated temperature. The composite may be incorporated in a molded synthetic resin (e.g., polyurethane) to obtain a flame and heat-resistant molded article in the form of a panel useful as a building material, which, in turn, may be sandwiched between a facing material (e.g., a steel plate, plywood, etc.) and a backing material (e.g., aluminum foil, asbestos paper, etc.) to form a heat-resistant structure which is also useful as a building material. The composite may also be formed by mixing and pelletizing at least one organic filler material with a clay (e.g., kaolin, bentonite, etc.) and incorporating this composite into a synthetic resin panel to obtain a flame and heat-resistant panel also suitable as a building material.

25 Claims, No Drawings

GRANULATED FIRE RETARDANT MATERIALS

The present invention relates to novel granular fire-retardant materials and the application thereof. In particular, the fire-retardant materials of the present invention comprise granules wherein core materials of a porous or spongy structure are filled with one or more inorganic materials capable of foaming at an elevated temperature to form a composite structure and, if desired, then coated with a non-permeable protective film.

The granular fire-retardant materials of the present invention are effective for modifying organic polymer plastics which are inherently combustible to impart flame-retarding properties to the plastics by incorporating the granular fire-retardant materials into said plastics when the latter are molded into plastic panels as building materials.

According to the present invention, the porous materials comprising the core may include soft liparite, spongy materials, pumice and the like. Since, however, core materials of granular form are desirable, those available inexpensively in a large amount such as perlite balloon, volcanic ash balloon, vermiculite and the like are preferred. One or more inorganic foaming agents penetrates into the core material through the surface thereof so as to form a fire-retardant composite in which the inorganic foaming agents extend uniformly into the porous or cellular structure of the core material.

It is appreciated that porous, cellular or foamed structure can include, in a strictly microscopic meaning, all materials of solid structure. Within such meaning, the core material may include inorganic mixtures comprising, for example, plaster, sodium, bicarbonate, sodium carbonate or the like, inexpensive diatomaceous earth or clays such as kaolin, bentonite and the like which are pelletized and calcined to form unglazed pellets.

Consequently, when an inexpensive powdery material such as various clays is employed to be pelletized, it may be easily carried out and is within the scope of the present invention, to blend, if necessary, one or more suitable bonding agents or binders into an inorganic powder capable of foaming at an elevated temperature, such as borax, phosphates, and silicates to form the pellets. Conventional binders such as starch or similar pastes, CMC, or PVA may be used.

The inorganic materials capable of foaming at an elevated temperature are defined generically as those forming a porous layer upon dehydration or degassing at an elevated temperature and include inorganic hydrated salts, borates, silicates, phosphates and the like and those forming a cellular structure by being softened upon heating and being expanded by the action of spontaneously released steam or other gas.

It is well known that inorganic materials such as borax, sodium silicate (water glass), sodium secondary phosphate and the like may be incorporated into various organic materials as a heat protective material and used commercially as a flame retardant.

The mechanism of heat protection and flame retardation have been believed to be such that such inorganic materials begin to soften by being exposed to an elevated temperature to form many fine bubbles as referred to hereinbefore and to form minute cellular heat insulating film walls. In particular, silicious materials form ceramic films which show high heat insulating activity and impart a flame retarding effect to organic materials containing them in a large amount due to the incombustibility of silicious materials per se. As a result, if such an inorganic foaming material is incorporated into various organic materials such as synthetic resins, the heat protective and flame retarding activities of the resins are believed to be improved.

The porous core materials for the heat protective products of the present invention may include inorganic noncombustible or flame deterring materials and organic combustible materials, but desirably include inherently noncombustible inorganic porous or cellular materials.

The present invention is intended to form granules comprising, for example, a noncombustible porous core material and an inorganic foaming material incorporated uniformly therein. The present invention thus provides products for applications suitable to be called pelletized flame retarding agents or heat protective materials and products which can be expected to have flame resisting activity. For example, when panels for building employing various synthetic resins are molded, it has been shown that the flame retarding activity of resin panel formed is improved considerably merely by incorporating said inorganic flame retarding material therein, although depending on the properties of the resin employed.

However, it cannot be carried out easily and it may be impossible in many cases to incorporate directly, conveniently and effectively, a large amount of the powdery inorganic material. It is not practicable to incorporate simply a powdery flame retarding agent as such into a resin or the like.

On the other hand, the heat protective materials which are formed into pellets according to the present invention can be incorporated easily in a large amount into various resins to improve the heat protective and flame retarding activities markedly.

Among various inorganic foaming agents, certain materials may foam sufficiently at an elevated temperature of several hundred degress centigrade. However, when a composite is heated together with two or more foaming agents, the composites may foam synergistically in many cases. Hence, when two or more foaming agents are blended into a resin to form the composite pellets, more effective layers can be formed with improved heat protective and flame retarding activities.

The most desirable porous or cellular light weight materials used as the core material should be those obtained inexpensively in a large amount from natural sources with manual treatment as little as possible, such as perlite granules, volcanic ash granules and the like.

Perlite granules volcanic ash particles and the like are used generally as such as an aggregate or a reinforcing material, or a filler as a so-called light weight aggregate. As is well known, perlite is a porous powder or particle obtained by calcinating rocks such as obsidian, perlite or the like and has, in general, a heat resisting property of higher than 1000° C. It has been employed in a large amount as a light weight aggregate for various composite panels for building, light weight concrete and the like. In particular, it has been proposed to test the resins for improving them economically and for improving their heat protective and heat proofing properties.

It has been found that when the porous core materials employed in the present invention are an inorganic incombustible material such as said perlite granules to be blended as an aggregate as such into a combustible material such as an organic resin, the resulting product containing a combustible material is connected into a flame retarding material. It is also well known that when a so-called inorganic foaming material is incorporated similarly in a large amount into a combustible resin, the flame retarding activity of said resin can be improved correspondingly to some extent.

However, the mechanism for improving the flame retarding activity of resins is different in the case of inorganic porous materials such as perlite which have been calcined and converted into cellular structures at an elevated temperature from the case where an inorganic foaming material having water of crystallization is incorporated into the resins. In the former case, the inorganic material is present as an inherently incombustible material in, for example, the resin structure in a predetermined proportion so that the flame retarding activity is provided by reducing the proportion of a combustible resin or combustible ingredient per unit volume. When such a blended or composite resin is exposed to a flame, the porous material such as perlite incorporated therein as an aggregate remains incombustible, whereas the synthetic resin component is inevitably burnt. As the volume ratio of combustible component to the incombustible component is reduced relatively, its flame retarding activity means that no violent flame is developed. On the contrary in the latter case, the incombustible component releases water of crystallization not only to prevent the resin material from spreading fire by reducing the surrounding temperature but it also forms a thin cellular film of heat protective structure such as a ceramic structure to provide the inherently combustible resin with a flame retarding property by the synergistic effect of the heat insulating property and said action of crystallization water of the incombustible component.

It is questionable to prove whether all of such inorganic foaming materials always retain water of crystallization at an elevated temperature under such conditions or not. It can also be said that inorganic materials cannot always foam at an elevated temperature unless they contain water in the form of crystallization water. The inventors have confirmed experimentally that certain inorganic materials foam more violently and more rapidly to some extent by heating them in the presence of two or more materials in combination than in the single presence of a material to form a compact and heat resisting layer of thin walled cellular structure.

It is thus an object of the present invention to provide a new fire resisting particulated material which can be incorporated conveniently in a large amount into a molded structure of, for example, a synthetic resin, which has a relatively high hardness or compressive strength at ambient temperature to such an extent as to provide a sufficient strength as an aggregate which can be handled and incorporated easily into resins and in which the aggregate can foam spontaneously at an elevated temperature such as encountered in fire accidents to prevent the spreading of fire over the molded structure of resin composite.

The porous particles such as perlite particles themselves may be put into practical use as a filler for molded articles of synthetic resins or as an adjuvant for improving the incombustible property of the resin, but are disadvantageous in practical use in that they are too soft and collapse by pressing between fingers so that notwithstanding that they are light and incombustible, they cannot be incorporated easily into a highly viscous resin or the like due to their excessively light weight.

Accordingly, the inventors of the present invention intend to impregnate soft and porous particles such as perlite and the like with one or more of the various inorganic foaming materials and to heat the impregnated particles to dryness or to treat the inorganic foaming materials in similar manner to improve the core materials so as to have high physical or mechanical strength, to enhance the reinforcement of core material sufficient as an aggregate, and to improve the specific gravity so as to enable it to be incorporated easily into a resin or the like.

It is thus another object of the present invention to provide a pelletized or particulated heat protective aggregate which is easily controlled and handled and has a high workability in operations such as mixing and the like for improving the inflammability of a resin by incorporating said aggregate into the resin.

The heat protective aggregates of the present invention can be put into practical use, for example in molded articles such as panels made of polyurethane foam. Especially, rigid polyurethane foam has been widely put into practical use as a building material such as outdoor siding, sealing, flooring partition walls by molding into panels. However, the rigid foam is extremely combustible and no flame retarding agent which has been proved to be sufficiently effective for providing flame retarding activity when incorporated therein has been developed. When an inorganic porous material such as said perlite, borax or the like is incorporated therein, the heat protective and flame retarding effects and economics of the foam would be expected to be improved theoretically to a significant extent. In practice, however, perlite, for example, is too light to be incorporated with the starting concentrate of polyurethane foam having a high viscosity. Borax as such cannot be blended easily. Thus the incorporation may be possible theoretically but cannot be carried out as a practical matter. Even though perlite could be incorporated in a large amount into polyurethane resin in a suitable manner as a filler, it is disadvantageous in that as an inherent property, it adsorbs moisture alone or together with the water of crystallization of such an inorganic foaming material so as to deteriorate the physical properties sought in a wasteful production of the product and in irregular cellular structure of polyurethane product.

Accordingly, it is a further object of the present invention to provide heat protective particles of improved specific gravity and physical strength by filling inorganic materials into lighter porous particles to form a composite of high density and high heat protective activity which may, if desired, be coated with a nonpermeable thin film over the outer surface of the particles to form the composite of capsulated structure for preventing the inherent effloresence or deliquescence of said inorganic foaming material and for preventing the absorption or evaporation of moisture and for improving an affinity to a resin such as polyurethane.

It is a still further object of the present invention to provide flame retarding panels of a synthetic resin for building provided with inflammability by blending a granular heat protective composite produced by impregnating or treating in similar manner one or more inorganic materials which foam at an elevated temperature into a porous core material such as perlite and heating to dryness, into a resin such as polyurethane.

Other objects of the present invention will be apparent from the following detailed description.

The core materials according to the present invention to be impregnated with one or more inorganic materials capable of foaming at an elevated temperature should be porous.

The porous core materials are represented as a carrier for one or more inorganic heat protective materials with the organic material capable of foaming at an elevated temperature being used to fill the pores of said porous structure.

The materials usable as porous core materials and usable in the present invention include, for example, perlite particles, volcanic ash granules, silica balloons, pumice particles, talc, coke, soft liparite, spongy materials, artificial porous materials, artificial porous clay granules, porous synthetic resin beads and the like. However, from the stand point of the flame retarding property characterizing the present invention, it is desirable to eliminate combustible organic materials such as spongy materials and the like.

The size of the porous pore materials is selected depending on the purposes intended from particles having a size of powder to those having a diameter of several mm or larger.

The inorganic foaming materials to be impregnated with said core materials include borates such as borax, sodium metaborate and the like; silicates such as sodium silicate, sodium metasilicate and the like; phosphates such as sodium secondary phosphate, sodium metaphosphate and the like, one more of which are used to fill the porous core material concurrently or separately.

Besides those listed above, there are many inorganic material capable of foaming at an elevated temperature. In preferred embodiments of the present invention, a better result can be achieved by the use of the combination of two or more foaming materials rather than the use of a single foaming material. For example, there can be used a mixture of borax and one or more sodium silicate, that of boric acid and water, that of phosphates and an aluminium compound or a zinc compound or that of powdered silica and crystafalite or tridymite obtained, for example, by kneading them in an alkaline solution such as aqueous caustic soda solution, and the like.

In particular, such borate compounds as represented by borax is a ternary system of $Na_2O$, $B_2O_3$ and $H_2O$, the most available system being sodium tetraborate decahydrate, $Na_2B_4O_7 \cdot 10H_2O$ which has a melting point of about 75° C, an initiating temperature for foaming ranging from 120° to 160° C to form a cellular layer of heat protecting thin film within a relatively low temperature range.

The main component of the thin cellular film comprises so-called anhydrous borax which has a melting point of about 740° C so that it can be fire resistant as such at an elevated temperature such as at fire accidents. Similarly, conventional sodium metaborate has a property capable of expanding and foaming at an elevated temperature. Such borate compounds change their physical properties continuously by changing the molar ratios of the components, particularly the molar ratio of water to boron in said ternary system. However, it is not easy to bring about the initial temperature of evaporation of water, namely the foaming temperature due to the water of crystallization and at the level the heat resistive temperature of cellular layer of foamed thin film should be expected to be maintained.

Even though said borate compound could be incorporated in a large amount as a fire retarding agent in the composition of snythetic resin panels for walls, it is not easy to determine and to maintain the ideal serial flame retarding actions so that the flame retarding agent liberates water effectively by starting the dehydration at the initial combustion temperature such as is encountered in fire accidents to reduce the surrounding temperature by absorbing the latent heat of vaporization when the water of crystallization is evaporated so as to prevent the fire from spreading into the resinous structure in the composite panels and at the same time forming a heat protective cellular layer by foaming of the foaming agent itself so as to further prevent the fire from spreading into the inner portions of the resinous panel structure and finally forming, for example, a ceramic binder from the heat resistive cellular layer to maintain the carbon skeleton of carbonized resin.

However, according to the present invention, it is not always impossible to control such a series of actions for the reason that it is well known that, as mentioned above, such borate compound changes the physical properties such as the melting point by changing the proportions of the ternary system comprising the components of such a flame retarding material so that it would be assumed to be eventually possible to control the desired transformation of states, the timing thereof and the temperature range by selecting the proper proportions of the components thereof. As a result of repeated experimentation under such a premise, the inventors have found that excellent overall flame retarding property can be obtained by defining the composition of metaborate having a general formula of $x\, Na_2O \cdot y\, B_2O_3 \cdot z\, H_2O$ within the ranges shown by the following equations:

$$0.25 \leq x/y \leq 1.5$$

and $$0.8(x + y) \leq z \leq 5(x + y),$$

the composition being obtained by blending a suitable borate compound, an alkali and water.

The term "overall flame retarding activity" means that the compositions show an excellent adaptability such as the melting behavior, fluidity, foaming activity and the like corresponding to the temperature change, heating rate or temperature increasing rate and other factors under an abnormal temperature condition such as fire accidents to expectedly form a fine foamed layer to an extremely high extent, to cover completely the resinous structure and to insulate safely and surely against the heat and flame.

As referred to hereinbefore, the novel flame retarding borate compositions are made of a boron compound, an alkali and water. Such boron compounds include, for example, boron oxides, orthoboric acid, metaboric acid, pyroboric acid, hydrated ro anhydrous borates and the like.

The alkali may include such as hydrated or anhydrous caustic soda, and sodium carbonates.

The water may be added or alternatively replaced by water of crystallization contained in said borates.

Silicate mixtures represented by water glass can foam to the same extent as borax and the like at an elevated temperature. For example, when a silicate is incorporated into polyurethane or the like and the composite is exposed to an elevated temperature, the silicate forms a cellular thin film inherent to the silicate and when exposed to a further higher temperature, it forms eventually a glass-like or ceramic bridging structure to maintain the residual carbide skeleton, namely, to retain said shape.

Moreover, since both the borates and silicates exhibit deliquescence or efflorescence, it is desirable that they be capsulated or coated with, for example, a nonpermeable film material.

The most general procedure for filling the pores of porous core material such as perlite or the like with one or more inorganic foaming materials comprises melting the inorganic foaming materials in solution or in a slurry, impregnating the core material therewith or coating it therewith and heating to dryness. If desired, the porous core material may be pulverized and fluxed with one or more of the desired inorganic foaming materials, pelletized and heated to dryness to provide heat protective particles exhibiting the same properties.

The present invention will be illustrated by way of the following example wherein a granular heat protective material is prepared by filling a core material of perlite particles with an inorganic mixture of a boron compound and a siliceous material.

The following materials are prepared:
(1) Perlite having a mean diameter of 3 mm: 50 parts by weight
(2) Borax: 140 parts by weight
(3) Caustic soda: 30 parts by weight
(4) Water: 30 parts by weight Components (2) and (3) are mixed thoroughly, melted under agitation by warming the mixture at 110° C, into which component (1) is added and impregnated for 5 minutes under agitation. After the pores of component (1) have been impregnated with the mixture of components (2) and (3), component (4) is added therein and again agitated uniformly for about 5 minutes. After the particles of composite structure have been produced by impregnating component (1) with (2), (3) and (4) the particles are removed from the reactor and cooled at ambient temperature.

The pores of particles thus produced are filled with composite compactly to form solid spheres as a whole.

The spherical particles have a varied specific gravity depending on the humidity and occuluded water content but in general have a specific gravity of about 1.4. Hence they are suitably heavy as compared with the mean specific gravity of about 0.1 of perlite itself. For example, when the spherical particles are incorporated into a viscous synthetic resin melt, the workability such as mixing is improved markedly to obtain favorable results.

Since, however, as referred to hereinbefore, the particles exhibit efflorescence or deliquescence upon standing, they deteriorated rapidly so that they can not to be kept or stored for a long period of time. Hence it is undesirable to incorporate the particles as such into panels of synthetic resin for building.

Accordingly, in this example, the surface of particles is coated and the particles are encapsulated with a thin nonpermeable film of, for example, polyethylene. As a result, the particles have been shown to have a resistance of 1000 hours in the test by means of a sun-shine weatherometer (promoting and forced weathering test according to "Acetic acid -slat spray testing" specified in ASTM-B 287-62).

As such coating material, beside PE as referred to above, CMC, starch, acacia gum, various waxes such as paraffin and the like may be employed.

The above example illustrates only one embodiment where several inorganic foaming materials are mixed and used to impregnate the pores of a porous core material. Various embodiments may be carried out without departing from the spirit of the present invention by combining various types of inorganic materials to be mixed, selecting the core material and impregnating conditions and filling the core material with the inorganic materials.

It is also possible to improve the flame retarding activity by incorporating it into any combustible material. An embodiment will be described hereinafter where flame retarding particles are incorporated into a synthetic resin.

Although the flame retarding particles of the present invention can be applicable to any conventional thermoplastic or thermosetting resin available commercially at present, in this example, there will be disclosed an embodiment where wall panels for building are prepared by employing rigid polyurethane foam.

The following materials are prepared.
(1) Polyurethane resin: 50 parts by weight
(2) Heat protective particles according to the present invention: 40 parts by weight
(3) Color finished thin steel plate as a top surface of the composite
(4) Aluminium foil as a rear surface of the composite A mixture of components (1) and (2) is mixed throughly and scattered uniformly on the rear surface of component (3) and the backing component (4) is piled thereon prior to the foaming reaction. The composite is pressed to a desired thickness by means of a press and is aged for about 3 minutes at about 45° C. When removed from the press, there is obtained a laminating composite comprising a flame retarding hard polyurethane foam sandwiched between the top steel plate and rear aluminium foil.

When the laminated composite is exposed directly to flame at about 1000° C by means of a burner from the top surface of steel plate, the sandwiched polyurethane foam layer is not burnt, showing inflammable activity.

In addition, the granulated material as such has an extremely high compressive strength so that it functions effectively as a reinforcing aggregate by reinforcing and covering completely the polyurethane structure which has inherently insufficient tensile, bending and other mechanical strength to provide the solid synthetic resinous laminated panels.

The incorporation of the flame retarding agent according to the present invention does not interfere with the chemical foaming action of polyurethane and enhances markedly the economics of resin cost.

The above embodiment illustrates one example to show how far very conventional outdoor wall panels of hard polyurethane foam for building can be improved as to their flame retarding activity. It is to be noted that the process is not intended to be limited to polyurethane resin. The process of the present invention can provide flame retarding panels inexpensively in a large amount, for example, by employing metallic spandrel material as a sheath and pouring and filling a resin admixed with a heat protective material of the present invention therebetween, or lining thin plywood with such a heat protective material, or laminating or sandwiching tarfelt, plaster board or other facings with the similar flame retarding resin.

In the preparation of various non-flammable panels, the lining resin material and heat protective particles should not always be premixed. For example, a good result can be obtained by covering the heat protective particles uniformly on a facing such as asbestos paper or thin steel plate and then pouring a suitable resin thereon and, if desired, pressing the resulting composite. In short, it should be noted that various modifications can be made within the scope of the present invention and that such modifications are to be construed as falling within the scope of the present invention.

What we claim is:

1. A heat-resistant composite in the form of a solid sphere comprising a noncombustible porous core material impregnated or coated with an inorganic material capable of foaming spontaneously when heated at an elevated temperature.

2. The heat-resistant composite of claim 1 encapsulated in an impermeable coating over the entire surface thereof.

3. A heat-resistant material in the form of a molded article comprising a synthetic resin in the form of a molded article having incorporated therein the composite of claim 1 as an aggregate.

4. The heat-resistant material of claim 3 wherein the molded article is a panel.

5. The heat-resistant composite of claim 1 wherein the inorganic material is a member selected from the group consisting of a borate, a silicate, a phosphate, and mixtures thereof.

6. The heat-resistant material of claim 5 wherein the borate is a member selected from the group consisting of borax and sodium metaborate.

7. The heat-resistant material of claim 5 wherein the silicate is a member selected from the group consisting of sodium silicate and sodium metasilicate.

8. The heat-resistant composite of claim 5 wherein the phosphate is a member selected from the group consisting of secondary sodium phosphate and sodium metaphosphate.

9. The heat-resistant composite of claim 1 wherein the porous core material is a particulate light-weight material selected from the group consisting of calcined perlite, calcined volcanic ash, and calcined vermiculite.

10. The heat-resistant composite of claim 1 wherein the porous core material is a particulate material selected from the group consisting of artificial stone, sponge, and synthetic resin beads.

11. The heat-resistant composite of claim 1 wherein the porous core material is perlite and the inorganic material is sodium metaborate.

12. The heat-resistant composite of claim 11 wherein the surface of the porous core material is covered with a thin impermeable film.

13. A flame and heat-resistant panel comprising polyurethane foam molded in the form of a panel and having incorporated therein the composite of claim 2 as an aggregate.

14. A flame and heat-resistant structure comprising the panel of claim 13 sandwiched between a facing material and a backing material.

15. The flame and heat-resistant structure of claim 14 wherein the facing material is a member selected from the group consisting of a steel plate, plywood, plaster board, and asbestos board.

16. The flame and heat-resistant structure of claim 14 wherein the backing material is a member selected from the group consisting of backing paper, aluminum foil, tarfelt, and asbestos paper.

17. The heat-resistant composite of claim 11 wherein the sodium metaborate has the general formula $$x\,Na_2O \cdot y\,B_2O_3 \cdot z\,H_2O$$

in which the values of $x$, $y$, and $z$ are in the following range:

$$0.25 \leq x/y \leq 1.5$$

and $$0.8\,(x+y) \leq z \leq 5\,(x+y).$$

18. The heat-resistant composite of claim 1 which comprises a pelletized and calcined mixture of clay and a member selected from the group consisting of plaster, sodium carbonate, and perlite powder as the core material.

19. The heat-resistant composite of claim 18 wherein the inorganic material capable of foaming spontaneously when heated at an elevated temperature is a member selected from the group consisting of a borate, a phosphate, and a silicate.

20. The heat-resistant composite of claim 18 wherein the clay is a member selected from the group consisting of kaolin and bentonite.

21. A flame and heat-resistant panel for building comprising a molded panel of a synthetic resin having incorporated therein the heat-resistant composite of claim 18 as an aggregate.

22. A flame and heat-resistant panel for building comprising a molded panel of a synthetic resin having incorporated therein the heat-resistant composite of claim 19 as an aggregate.

23. A flame and heat-resistant panel for building comprising a molded panel of a synthetic resin having incorporated therein the heat-resistant composite of claim 20 as an aggregate.

24. The heat-resistant material of claim 3 wherein the synthetic resin is combustible.

25. The heat-resistant material of claim 21 wherein the combustible synthetic resin is polyurethane.

* * * * *